United States Patent
Matsunaga et al.

(10) Patent No.: US 10,676,803 B2
(45) Date of Patent: *Jun. 9, 2020

(54) COPPER ALLOY FOR ELECTRONIC/ELECTRICAL DEVICE, COPPER ALLOY PLASTICALLY-WORKED MATERIAL FOR ELECTRONIC/ELECTRICAL DEVICE, COMPONENT FOR ELECTRONIC/ELECTRICAL DEVICE, TERMINAL, AND BUSBAR

(71) Applicant: MITSUBISHI MATERIALS CORPORATION, Tokyo (JP)

(72) Inventors: Hirotaka Matsunaga, Okegawa (JP); Kazunari Maki, Saitama (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 58 days.

This patent is subject to a terminal disclaimer.

(21) Appl. No.: 15/741,148

(22) PCT Filed: Sep. 8, 2016

(86) PCT No.: PCT/JP2016/076456
§ 371 (c)(1),
(2) Date: Dec. 29, 2017

(87) PCT Pub. No.: WO2017/043577
PCT Pub. Date: Mar. 16, 2017

(65) Prior Publication Data
US 2018/0187292 A1   Jul. 5, 2018

(30) Foreign Application Priority Data

Sep. 9, 2015 (JP) ................. 2015-177743
Dec. 1, 2015 (JP) ................. 2015-235096
Mar. 30, 2016 (JP) ................. 2016-069178

(51) Int. Cl.
*B21C 37/00* (2006.01)
*C22C 9/00* (2006.01)
(Continued)

(52) U.S. Cl.
CPC .............. *C22C 9/00* (2013.01); *B32B 15/018* (2013.01); *B32B 15/20* (2013.01); *H01B 1/02* (2013.01);
(Continued)

(58) Field of Classification Search
None
See application file for complete search history.

(56) References Cited

U.S. PATENT DOCUMENTS 3,677,745 A * 7/1972 Finlay .................. C22C 9/00
420/494
3,778,318 A   12/1973 Hay et al.
(Continued)

FOREIGN PATENT DOCUMENTS

CN   1574107 A   2/2005
CN   102108457 A   6/2011
(Continued)

OTHER PUBLICATIONS

Jingpu Wang et al., "Cable Materials," *Mechanical Industry Press*, Nov. 1983, pp. 80-81.
(Continued)

*Primary Examiner* — Seth Dumbris (57) ABSTRACT

A copper alloy for an electronic and electric device is provided. The copper alloy includes: Mg in a range of 0.15 mass % or more and less than 0.35 mass %; and a Cu balance including inevitable impurities, wherein the electrical conductivity of the copper alloy is more than 75% IACS, and a strength ratio $TS_{TD}/TS_{LD}$, which is calculated from strength $TS_{TD}$ obtained in a tensile test performed in a direction
(Continued)

perpendicular to a rolling direction and strength $TS_{LD}$ obtained in a tensile test performed in a direction parallel to a rolling direction, is more than 0.9 and less than 1.1. The copper alloy may further include P in a range of 0.0005 mass % or more and less than 0.01 mass %.

11 Claims, 1 Drawing Sheet

(51) Int. Cl.
  H01B 1/02        (2006.01)
  H01B 5/02        (2006.01)
  B32B 15/01       (2006.01)
  B32B 15/20       (2006.01)
  H01R 4/58        (2006.01)
  C22F 1/08        (2006.01)
(52) U.S. Cl.
  CPC .............. H01B 1/026 (2013.01); H01B 5/02 (2013.01); H01R 4/58 (2013.01); C22F 1/08 (2013.01); Y10T 428/12431 (2015.01); Y10T 428/12903 (2015.01)

(56) References Cited

U.S. PATENT DOCUMENTS

| | | | |
|---|---|---|---|
| 5,486,244 A * | 1/1996 | Caron | C22C 9/00 |
| | | | 148/554 |
| 5,667,752 A | 9/1997 | Suzuki et al. | |
| 2002/0044881 A1* | 4/2002 | Breedis | C22C 9/00 |
| | | | 420/496 |
| 2004/0238086 A1 | 12/2004 | Saleh | |
| 2009/0239398 A1* | 9/2009 | Lynch | H01R 12/585 |
| | | | 439/81 |
| 2010/0269963 A1* | 10/2010 | Hirose | C22C 9/06 |
| | | | 148/685 |
| 2011/0146855 A1 | 6/2011 | Sakurai et al. | |
| 2014/0193293 A1 | 7/2014 | Shishido et al. | |
| 2014/0209221 A1* | 7/2014 | Kumagai | C22C 9/00 |
| | | | 148/681 |
| 2014/0283962 A1 | 9/2014 | Ito et al. | |
| 2016/0201179 A1 | 7/2016 | Miyagi et al. | |
| 2018/0040389 A1 | 2/2018 | Matsunaga et al. | |

FOREIGN PATENT DOCUMENTS

| | | |
|---|---|---|
| CN | 102203916 A | 9/2011 |
| CN | 105369050 A | 3/2016 |
| EP | 3438299 A1 | 2/2019 |
| JP | 58-199835 A | 11/1983 |
| JP | 61-284946 A | 12/1986 |
| JP | 05-311283 A | 11/1993 |
| JP | 2007-056297 A | 3/2007 |
| JP | 2009-228013 A | 10/2009 |
| JP | 2011-174127 A | 9/2011 |
| JP | 2011-241412 A | 12/2011 |
| JP | 2012-007231 A | 1/2012 |
| JP | 5045783 B | 10/2012 |
| JP | 2013-253267 A | 12/2013 |
| JP | 2014-025089 A | 2/2014 |
| JP | 2014025089 * | 2/2014 ............... C22C 9/00 |
| JP | A-2014-047378 | 3/2014 |
| JP | 2014-114464 A | 6/2014 |
| JP | 2015-045083 A | 3/2015 |
| JP | 2015-048503 A | 3/2015 |
| JP | 2015-101773 A | 6/2015 |
| JP | 5910790 B | 4/2016 |
| JP | 6187629 B | 8/2017 |

OTHER PUBLICATIONS

Office Action dated Jun. 12, 2019 for the corresponding Chinese Patent Application No. 201680008019.8.
David Chapman: "Coatings" In: "Copper for Busbars", May 31, 2014 (May 31, 2014), Copper Development Association, pp. 103-105.
Office Action dated Feb. 28, 2019 for the related European Patent Application No. 16844412.3.
European Search Report dated Mar. 7, 2019 for the corresponding European Patent Application No. 16844420.6.
Chinese Office Action dated Nov. 27, 2018 for the related Chinese Application No. 201680032061.3.
David Chapman "High Conductivity Copper for Electrical Engineering", May 31, 1998 [Retrieved from the Internet on Jul. 2, 2018].
R. Sundberg et al. "The Cu—Mg—P system: precipitation phenomena and physical properties", *Metal Technology*, Dec. 31, 1979, pp. 230-234, vol. 6, No. 1.
Extended European Search Report dated Jul. 11, 2018 for the related European Patent Application No. 16844412.3.
Office Action dated Apr. 4, 2018 for the corresponding Chinese Patent Application No. 201680008019.8
Chinese Office Action dated Dec. 27, 2018 for the related Chinese Application No. 201680008019.8.
Maki Kazunari et al: "Solid-solution copper alloys with high strength and high electrical conductivity", Scripta Materialia, Elsevier, Amsterdam, NL, vol. 68, No. 10 Jan. 2, 2013 (Jan. 2, 2013), pp. 777-780.
Maki Kazunari et al: "Supplementary information to Solid-solution copper alloys with high strength and high electrical conductivity", Scripta Materialia, vol. 68, No. 10, Jan. 2, 2013 (Jan. 2, 2013), pp. 777-780.
Zhu Chengcheng et al: "Effect of ECAP combined cold working on mechanical properties and electrical conductivity of Conform-produced Cu—Mg alloys", Journal of Alloys and Compounds, vol. 582, Aug. 14, 2013 (Aug. 14, 2013), pp. 135-140.
ASM: "Casting of Copper and Copper Alloys" In: "Casting", Dec. 31, 2008 (Dec. 31, 2008), ASM International, pp. 1026-1048.
European Search Report dated Apr. 17, 2019 for the corresponding European Patent Application No. 16844417.2.
European Search Report dated Apr. 18, 2019 for the corresponding European Patent Application No. 16844438.8.
International Search Report dated Nov. 8, 2016 for the corresponding PCT Application No. PCT/JP2016/076456.
International Search Report dated Nov. 8, 2016 for the corresponding PCT Application No. PCT/JP2016/076362.
International Search Report dated Nov. 8, 2016 for the corresponding PCT Application No. PCT/JP2016/076376.
International Search Report dated Dec. 6, 2016 for the corresponding PCT Application No. PCT/JP2016/076387.
Notice of Allowance dated May 9, 2017 for the related Japanese Patent Application No. 2016-575989.
International Search Report dated Jun. 27, 2017 for the related PCT Application No. PCT/JP2017/012914.
Notice of Allowance dated Sep. 12, 2017 for the related Japanese Patent Application No. 2017-063418.
Chinese Office Action dated Aug. 1, 2019 for the related Chinese Patent Application No. 201780005558.0.
Extended European Search Report dated Nov. 8, 2019 for the related European Patent Application No. 17775233.4.
U.S. Office Action dated Jul. 11, 2019 for the related U.S. Appl. No. 15/737,642.

* cited by examiner

COPPER ALLOY FOR ELECTRONIC/ELECTRICAL DEVICE, COPPER ALLOY PLASTICALLY-WORKED MATERIAL FOR ELECTRONIC/ELECTRICAL DEVICE, COMPONENT FOR ELECTRONIC/ELECTRICAL DEVICE, TERMINAL, AND BUSBAR

CROSS-REFERENCE TO RELATED PATENT APPLICATIONS

This application is a U.S. National Phase Application under 35 U.S.C. § 371 of International Patent Application No. PCT/JP2016/076456 filed on Sep. 8, 2016 and claims the benefit of Japanese Patent Applications No. 2015-177743, filed Sep. 9, 2015, No. 2015-235096, filed Dec. 1, 2015 and No. 2016-069178, filed Mar. 30, 2016, all of which are incorporated herein by reference in their entireties. The International Application was published in Japanese on Mar. 16, 2017 as International Publication No. WO/2017/043577 under PCT Article 21(2).

FIELD OF THE INVENTION

The present invention relates to a copper alloy for an electronic and/or electric device (electronic/electric device), which is suitable for terminals such as lead frames, connectors, press-fits and the like; a plastically-worked copper alloy material for an electronic and electric device made of the copper alloy for an electronic and electric device; a component for an electronic and electric device; a terminal; and a busbar.

BACKGROUND OF THE INVENTION

Conventionally, highly conductive copper or copper alloy is used for an electronic or electric device such as terminals of connectors, press-fits, or the like; relays; lead frames; bus bars; and the like.

In response to the size reduction of an electronic, an electric device, and the like, there have been attempts to reduce the size and thickness of components for an electronic and electric device used in the electronic device and electric device. Therefore, high strength and excellent bendability are required for the material constituting the component of the electronic or electric device.

Furthermore, in large terminals and bus bars to which a large current is applied, it is necessary to use a rolling material with less anisotropy.

For example, Cu—Mg alloys are proposed in Patent Literatures Japanese Unexamined Patent Application, First Publication No. 2014-025089 (A) and Japanese Unexamined Patent Application, First Publication No. 2014-114464 (A) as a material used for the electronic and electric device such as terminals; relays; lead frames; busbars; and the like.

DISCLOSURE OF INVENTION

Technical Problem

In the Cu—Mg-based alloy described in Japanese Unexamined Patent Application, First Publication No. 2014-025089 (A), since the content of Mg is high, conductivity is insufficient and it is difficult to apply the alloy to applications requiring high conductivity.

In addition, coarse precipitates are formed in the Cu—Mg alloy described in Japanese Unexamined Patent Application, First Publication No. 2014-114464 (A) since the Mg content is 0.01-0.5 mass % and the P content is 0.01-0.5 mass %. Thus, the cold workability and the bendability are insufficient.

The present invention is made under the circumstances described above. The purpose of the present invention is to provide a copper alloy for an electronic/electric device, a plastically-worked copper alloy material for an electronic or electric device, a component for an electronic or electric device, a terminal, and a busbar, all of which have excellent electrical conductivity, strength, and bendability; and less anisotropy.

SUMMARY OF THE INVENTION

Solution to Problem

In order to solve the above-described problem, a copper alloy for an electronic and electric device, which is an aspect of the present invention, (hereinafter, referred as "the copper alloy for an electronic and electric device of the present invention") is configured that the copper alloy for an electronic and electric device includes: Mg in a range of 0.15 mass % or more and less than 0.35 mass %; and a Cu balance including inevitable impurities, wherein the electrical conductivity of the copper alloy is more than 75% IACS, and a strength ratio $TS_{TD}/TS_{LD}$, which is calculated from strength $TS_{TD}$ obtained from a tensile test performed in a direction perpendicular to a rolling direction and strength $TS_{LD}$ obtained in a tensile test performed in a direction parallel to a rolling direction, is more than 0.9 and less than 1.1.

According to the copper alloy for an electronic and electric device configured as described above, the strength and the stress relaxation resistance can be improved without greatly decreasing the electrical conductivity by solid melting Mg in the Cu matrix phase since the Mg content is in the range of 0.15 mass % or more and less than 0.35 mass %. Specifically, since the conductivity is more than 75% IACS, it can be applied to applications requiring high conductivity.

In addition, since a strength ratio $TS_{TD}/TS_{LD}$, which is calculated from strength $TS_{TD}$ obtained in a tensile test performed in a direction perpendicular to a rolling direction and strength $TS_{LD}$ obtained in a tensile test performed in a direction parallel to a rolling direction, is more than 0.9 and less than 1.1, there is less strong anisotropy; a sufficient strength is secured even in the case requiring strength in both of the LD direction and the TD direction such as in terminals and busbars for high current usage; and occurrence of cracking or the like, which occurs by unnecessary high-strengthening in a specific direction, in bending work can be suppressed. In other words, the copper alloy can obtain excellent bendability in bending in a direction in which the bending axis is perpendicular to the rolling direction (GW bending) and in bending in a direction in which the bending axis is parallel to the rolling direction (BW bending).

In the copper alloy for electronic and electric device of the present invention, the copper alloy may further include P in a range of 0.0005 mass % or more and less than 0.01 mass %.

In this case, by adding P, the viscosity of the molten copper alloy containing Mg can be lowered, and castability can be improved.

In addition, in the case where the copper alloy for electronic and electric device of the present invention includes P in the above-described range, the Mg content [Mg] in a mass % and the P content [P] in a mass % may satisfy a relational expression of [Mg]+20×[P]<0.5.

In this case, it is possible to suppress the formation of coarse crystals containing Mg and P, and to suppress the deterioration of cold workability and bendability.

In addition, in the case where the copper alloy for electronic and electric device of the present invention includes P in the above-described range, the Mg content [Mg] in mass % and the P content [P] in mass %, may satisfy a relational expression of [Mg]/[P]≤400.

In this case, the castability can be improved reliably by defining the ratio between the content of Mg, which reduces the castability, and the content of P, which improves the castability, as described above.

In addition, in the copper alloy for electronic and electric device of the present invention, a ratio of crystals having a crystal orientation within 10° with respect to a Brass orientation {110} <112> may be 40% or less, and a ratio of crystals having a crystal orientation within 10° with respect to a Copper orientation {112} <111> may be 40% or less.

As the Brass orientation increases, the strength ($TS_{TD}$) in the BW direction (perpendicular to the rolling direction) increases; and as the Copper orientation increases, the strength ($TS_{LD}$) in the GW direction (parallel to the rolling direction) increases. Therefore, by limiting the ratio of the crystal having the Brass orientation and the crystal having the Copper orientation to 40% or less, it is possible to suppress the increase in either the strength in the BW direction or the strength in the GW direction. Moreover, it is possible to improve the bendability in GW bending and BW bending.

A plastically-worked copper alloy material for an electronic and electric device, which is other aspect of the present invention, (hereinafter referred as "the plastically-worked copper alloy material for an electronic and electric device of the present invention") is made of the above-described copper alloy for an electronic and electric device.

According to the plastically-worked copper alloy material configured as described above, the plastically-worked copper alloy material has excellent electrical conductivity, strength, bendability, and stress relaxation resistance, since it is made of the above-described copper alloy for an electronic and electric device. Thus, the plastically-worked copper alloy material is particularly suitable for the material of an electronic and electric device, such as: terminals of connectors, press-fits or the like; relays; lead frames; busbars, and the like.

In the plastically-worked copper alloy material for an electronic and electric device of the present invention, a Sn plating layer or a Ag plating layer may be provided.

In this case, the plastically-worked copper alloy material is particularly suitable for the material of an electronic and electric device, such as: terminals of connectors, press-fits or the like; relays; lead frames; busbars and the like since the Sn plating layer or the Ag plating layer is provided on the surface of the plastically-worked copper alloy material. In the present invention, "the Sn plating" includes a Sn plating of the pure Sn and a plating of a Sn alloy; and "the Ag plating" includes a plating made of the pure Ag and a plating made of a Ag alloy.

A component for an electronic and electric device, which is other aspect of the present invention, (hereinafter, referred as "the component for an electronic and electric device of the present invention") is made of the above-described plastically-worked copper alloy material for an electronic and electric device. The component for an electronic and electric device of the present invention includes: terminals of connectors, press-fits or the like; relays; lead frames; busbars and the like.

The component for an electronic and electric device configured as described above can exhibit excellent properties even if it is down-sized and thinned since it is produced by using the plastically-worked copper alloy material described above.

A terminal, which is other aspect of the present invention, (hereinafter, referred as "the terminal of the present invention") is made of the above-described plastically-worked copper alloy material for an electronic and electric device.

The terminal configured as described above can exhibit excellent properties even if it is down-sized and thinned since it is produced by using the plastically-worked copper alloy material described above.

A busbar, which is other aspect of the present invention, (hereinafter, referred as "the busbar of the present invention") is made of the above-described plastically-worked copper alloy material for an electronic and electric device.

The busbar configured as described above can exhibit excellent properties even if it is down-sized and thinned since it is produced by using the plastically-worked copper alloy material described above.

Advantageous Effects of Invention

According to the present invention, a copper alloy for an electronic and electric device; a plastically-worked copper alloy material for an electronic and electric device; a component for an electronic and electric device; a terminal; and a busbar, each of which has excellent electrical conductivity, strength, and bendability; and less anisotropy, can be provided.

DETAILED DESCRIPTION OF THE INVENTION

A copper alloy for an electronic and electric device, which is an embodiment of the present invention, is explained below.

The copper alloy for an electronic and electric device of the present embodiment has a composition including: Mg in the range of 0.15 mass % or more and less than 0.35 mass %; and the Cu balance including inevitable impurities.

In addition, the electrical conductivity is set to more than 75% IACS in the copper alloy for an electronic and electric device of the present embodiment.

In addition, a strength ratio $TS_{TD}/TS_{LD}$, which is calculated from strength $TS_{TD}$ obtained in a tensile test performed in a direction perpendicular to a rolling direction and strength $TS_{LD}$ obtained in a tensile test performed in a direction parallel to a rolling direction, is more than 0.9 and less than 1.1 in the copper alloy for an electronic and electric device of the present embodiment. That is, the present embodiment is a rolled material of a copper alloy for electronic and electrical devices, and the relationship between the strength $TS_{TD}$ obtained in a tensile test performed in a direction perpendicular to a rolling direction and the strength $TS_{LD}$ obtained in a tensile test performed in a direction parallel to a rolling direction in the final step in rolling is defined as described above.

In the copper alloy for electronic and electric device of the present embodiment, the copper alloy further includes P in a range of 0.0005 mass % or more and less than 0.01 mass %.

In the case where the copper alloy for electronic and electric device of the present embodiment includes P in the above-described range, the Mg content [Mg] in a mass % and the P content [P] in a mass % satisfy a relational expression of [Mg]+20×[P]<0.5.

In addition, in the case where the copper alloy for electronic and electric device of the present embodiment includes P in the above-described range, the Mg content [Mg] in mass % and the P content [P] in mass % satisfy a relational expression of [Mg]/[P]≤400.

In the copper alloy for electronic and electric device of the present embodiment, a ratio of crystals having a crystal orientation within 10° with respect to a Brass orientation {110} <112> is set to 40% or less, and a ratio of crystals having a crystal orientation within 10° with respect to a Copper orientation {112} <111> is set to 40% or less.

Reasons for setting the component compositions, the crystal orientation and each of characteristics as described above are explained below.

(Mg: 0.15 Mass % or More and Less than 0.35 Mass %)

By dissolving Mg in matrix of the copper alloy, it is possible to improve the strength and the stress relaxation resistance without significantly reducing the conductivity.

If the Mg content is less than 0.15 mass %, there would be a possibility that the above-described effect cannot be obtained sufficiently. In addition, since the alloy composition becomes close to the pure copper, the texture of the pure copper type is strongly formed after the finish rolling, and the ratio of the Copper orientation, which is a representative pure copper type orientation, which will be described later, becomes excessively high. Therefore, there would be a possibility that the strength ratio $TS_{TD}/TS_{LD}$ becomes smaller value than the above-described appropriate range.

On the other hand, when the content of Mg is 0.35 mass % or more, the conductivity reduces significantly, the brass type texture structure is formed after finish rolling, and the Brass orientation ratio described later becomes excessively high. Therefore, there would be a possibility that the strength ratio $TS_{TD}/TS_{LD}$ becomes larger value than the above-described appropriate range.

Moreover, there would be a possibility that the electrical conductivity is significantly reduced and the viscosity of the melted copper alloy is increased and the castability is reduced.

Accordingly, the Mg content is set to the range of 0.15 mass % or more and less than 0.35 mass % in the present embodiment.

In order to reliably improve the above-described technical effects, it is preferable that the lower limit of the Mg content is set 0.18 mass % or more. It is more preferable that the lower limit of the Mg content is set to 0.2 mass % or more. In addition, it is preferable that the upper limit of the Mg content is set to 0.32 mass % or less. It is more preferable that the upper limit of the Mg content is set to 0.3 mass % or less.

(P: 0.0005 Mass % or More and Less than 0.01 Mass %)

P is an element having effect of improving castability. In addition, P has a function of miniaturizing re-crystallized crystal grains by forming a compound with Mg.

If the P content were less than 0.0005 mass %, there would be a possibility that the above-described effect cannot be obtained sufficiently. On the other hand, if the P content were 0.01 mass % or more, there would be a possibility that cracking occurs in cold working or bending since above-described precipitates containing Mg and P are coarsened; and these precipitates become start points of breakage.

Accordingly, the P content is set to the range of 0.0005 mass % or more and less than 0.01 mass % in the present embodiment of adding P. In order to reliably improve the castability, it is preferable that the lower limit of the P content is set to 0.0007 mass % or more. It is more preferable that the lower limit of the P content is set to 0.001 mass % or more. In addition, in order to reliably suppress formation of the coarse precipitates, it is preferable that the upper limit of the P content is set to less than 0.009 mass %. It is more preferable that the upper limit of the P content is set to less than 0.008 mass %. It is most preferable that the upper limit of the P content is set to less than 0.0075 mass %.

([Mg]+20×[P]<0.5)

In the case of adding P, as described above, the precipitates containing Mg and P are formed by having Mg and P coexist.

If the value of [Mg]+20×[P] were 0.5 or more where [Mg] is the Mg content and [P] is the P content in mass %, there would be a possibility that cracking occurs in cold working or bending since the total amount of Mg and P is excessive; the precipitates containing Mg and P are coarsened and distributed in high density.

Accordingly, [Mg]+20×[P] is set to less than 0.5 in the present embodiment of adding P. In order to reliably suppress the coarsening and high-densification of the precipitates and formation of cracking in cold working or bending, it is preferable that [Mg]+20×[P] is set to less than 0.48. It is more preferable that [Mg]+20×[P] is set to less than 0.46.

([Mg]/[P]≤400)

In order to reliably improve castability, it is necessary for the ratio of the Mg and P contents to be optimized since Mg is an element having effect of increasing the viscosity of the copper alloy melt and reducing the castability.

If [Mg]/[P] exceeded 400 where [Mg] is the Mg content and [P] is the P content in mass %, there would be a possibility that the effect of improving the castability by adding P is reduced since the Mg content relative to P is increased.

Accordingly, [Mg]/[P] is set to 400 or less in the present embodiment of adding P. In order to further improve the castability, it is preferable that [Mg]/[P] is set to 350 or less. It is more preferable that [Mg]/[P] is set to 300 or less.

If [Mg]/[P] were excessively low, there would be a possibility that Mg is consumed as the precipitates; and the effect because of solid soluting of Mg cannot be obtained. In order to reliably improve the yield strength and the stress relaxation resistance because of solid soluting of Mg by suppressing the formation of the precipitates containing Mg and P, it is preferable that the lower limit of [Mg]/[P] is set to a value exceeding 20. It is more preferable that the lower limit of [Mg]/[P] is set to a value exceeding 25.

(Inevitable Impurities: 0.1 Mass % or Less)

As other inevitable impurities, Ag; B; Ca; Sr; Ba; Sc; Y; rare earth elements; Ti; Zr; Hf; V; Nb; Ta; Cr; Mo; W; Mn; Re; Fe; Ru; Os; Co; Se; Te; Rh; Ir; Ni; Pd; Pt; Au; Zn; Cd; Hg; Al; Ga; In; Ge; Sn; As; Sb; Tl; Pb; Bi; Be; N; C; Si; Li; H; O; S; or the like can be named. The total amount of these inevitable impurities is set to 0.1 mass % or less since they have action to reduce electrical conductivity. It is preferable that the total content of the inevitable impurities is set to 0.09 mass % or less. It is more preferable that the total content of the inevitable impurities is set to 0.08 mass % or less.

Since Ag, Zn, and Sn are easily dissolved in Cu for the electrical conductivity to be reduced, it is preferable that the total amount of Ag, Zn, and Sn is set to less than 500 mass ppm.

Moreover, Si, Cr, Ti, Zr, Fe and Co particularly reduce the electrical conductivity significantly and deteriorate the bendability by forming inclusion bodies. Thus, it is preferable that the total amount of Si, Cr, Ti, Zr, Fe, and Co is set to less than 500 mass ppm.

($TS_{TD}/TS_{LD}$: 0.9 or More and Less than 1.1)

In the case where the strength ratio $TS_{TD}/TS_{LD}$, which is calculated from strength $TS_{TD}$ obtained in a tensile test performed in a direction perpendicular to a rolling direction and strength $TS_{LD}$ obtained in a tensile test performed in a direction parallel to a rolling direction, is more than 0.9 and less than 1.1, there is less strong anisotropy; a sufficient strength is secured even in the case requiring strength in both of the LD direction and the TD direction such as in terminals and busbars for high current usage; and occurrence of cracking or the like, which occurs by unnecessary high-strengthening in a specific direction, in bending work can be suppressed. Because of these, the copper alloy can obtain excellent bendability in bending in a direction in which the bending axis is perpendicular to the rolling direction (GW bending) and in bending in a direction in which the bending axis is parallel to the rolling direction (BW bending).

It is preferable that the lower limit of the strength ratio $TS_{TD}/TS_{LD}$ is set to 0.94 or more in order to reliably obtain these technical effects. More preferably, it is set to 0.98 or more. In addition, it is preferable to set the upper limit of the strength ratio $TS_{TD}/TS_{LD}$ to 1.08 or less. More preferably, it is set to 1.06 or less.

(Electrical Conductivity: Exceeding 75% IACS)

The copper alloy for an electronic or electric device of the present embodiment can be suitably used as a component for an electronic or electric device such as: terminals of connectors, press-fits, or the like; relays; lead frames; busbars; and the like by setting the electric conductivity to a value exceeding 75% IACS.

It is preferable that the electrical conductivity is set to more than 76% IACS. More preferably, it is more than 77% IACS. Even more preferably, it is more than 78% IACS. Even more preferably, it is more than 80% IACS.

(Brass Orientation {110} <112>: Less than 40%)

As the Brass orientation increases, the strength in the BW direction increases. Therefore, the ratio of the crystals having a crystal orientation within 10° with respect to the Brass orientation {110} <112> is set to 40% or less in order to suppress the anisotropy of the strength.

The ratio of crystals having a crystal orientation within 10° with respect to the Brass orientation {110} <112> is preferably set to 30% or less, more preferably 20% or less in order to further suppress the anisotropy of the strength.

On the other hand, if the ratio of the Brass orientation were too low, the strength in the BW direction would become too low and there would be a possibility that the required strength cannot be obtained. Thus, the lower limit of the ratio of crystals having a crystal orientation within 10° with respect to the Brass orientation {110} <112> is preferably set to 1% or more, and more preferably to 5% or more.

(Copper Orientation {112} <111>: Less than 40%)

As the Copper orientation increases, the strength in the GW direction increases. Therefore, the ratio of the crystal having a crystal orientation within 10° with respect to the Copper orientation {112} <111> is set to 40% or less in order to suppress the anisotropy of the strength.

The ratio of crystals having a crystal orientation within 10° with respect to the Copper orientation {112} <111> is preferably set to 30% or less, more preferably 20% or less in order to further suppress the anisotropy of the strength.

On the other hand, if the ratio of the Copper orientation were too low, the strength in the GW direction would become too low and there would be a possibility that the required strength cannot be obtained. Thus, the lower limit of the ratio of crystals having a crystal orientation within 10° with respect to the Copper orientation {112} <111> is preferably set to 1% or more, and more preferably to 5% or more.

Figure 1:
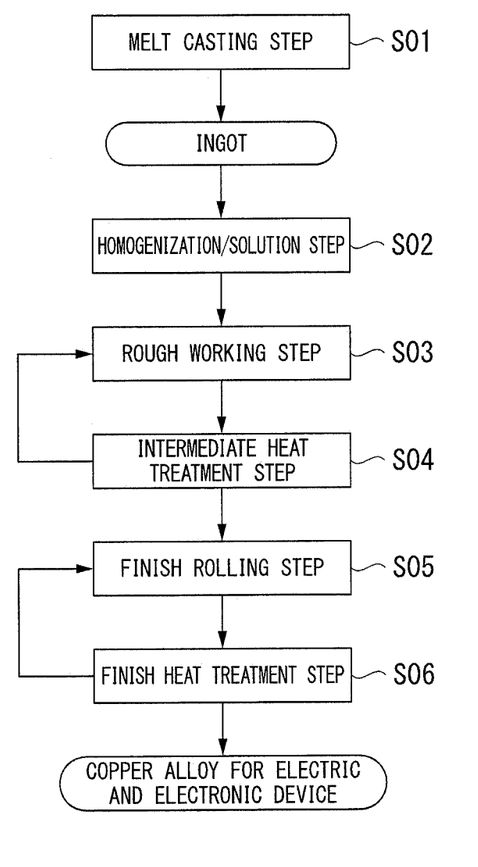
The FIGURE is a flowchart of a method of producing the copper alloy for an electronic and electric device of an embodiment of the present invention.

Next, a method of producing a copper alloy for an electronic and electric device of the present embodiment as configured above is explained in reference to the flowchart in FIG. 1.

(Melt Casting Step S01)

First, components are adjusted by adding the above-described elements to molten copper obtained by melting a copper raw material, thereby producing a molten copper alloy. Here, the molten copper is preferably a so-called 4NCu having purity set to 99.99% by mass or more; or a so-called 5NCu having purity set to 99.999% by mass or more. Meanwhile, as each of elements added, it is possible to use a single body of the element, an alloy of the element, or the like.

In addition, a raw material including the element may be melted together with the copper raw material. In addition, a recycled material or a scrapped material of the present alloy may also be used. In the melting step, it is preferable to perform atmosphere melting in an inert gas atmosphere with a low vapor pressure of $H_2O$ and keep the retention time in melting to the minimum in order to suppress oxidation of Mg; and reduce the hydrogen concentration.

Then, the ingot is produced by pouring the copper alloy melt with the adjusted component composition. In consideration of mass production, it is preferable that the continuous casting method or the semi-continuous casting method is used.

At this time, precipitates containing Mg and P are formed in solidification of the melt. Thus, by increasing the solidification rate, the size of the precipitates can be miniaturized further. Therefore, it is preferable that the cooling rate of the melt is set to 0.1° C./sec or more. More preferably, it is set to 0.5° C./sec or more. Most preferably, it is set to 1° C./sec or more.

(Homogenization/Solution Treatment Step S02)

Next, a heating treatment is carried out in order for homogenization of the obtained ingot and formation of a solid solution. Inside the ingot, an intermetallic compound including Cu and Mg as major components which is generated by Mg being condensed due to segregation in a solidification step is present. Therefore, in order to remove or reduce the segregation and the intermetallic compound, a heating treatment in which the ingot is heated to a temperature in a range of 300° C. to 900° C. is carried out, thereby homogeneously dispersing Mg or dissolving Mg in the matrix in the ingot. Meanwhile, this homogenization/solution treatment step S02 is preferably carried out in a non-oxidizing or reducing atmosphere.

Here, when the heating temperature is lower than 300° C., formation of a solid solution becomes incomplete, and there is a concern that a large amount of an intermetallic compound including Cu and Mg as major components may remain in the matrix. On the other hand, when the heating temperature exceeds 900° C., some of the copper material turns into a liquid phase, and there is a concern that the structure or the surface state may become uneven. Therefore, the heating temperature is set in a range of 300° C. to 900° C.

Hot working may be performed after the above-described homogenization/solution treatment step S02 for efficient rough working which is described below and homogenization of the structure. In this case, the processing method is not particularly limited. For example, rolling, drawing, extrusion, groove rolling, forging, pressing, or the like can be used. In addition, it is preferable that the temperature of hot working is set to the range of 300° C. or more and 900° C. or less.

(Rough Working Step S03)

In order to shape the material into a predetermined shape, rough working is performed. The temperature condition in the rough working step S03 is not particularly limited. However, it is preferable that the temperature condition is set to the range of −200° C. to 200° C., which corresponds to cold or warm rolling, in order to suppress recrystallization or to improve dimensional accuracy. It is particularly preferable that the temperature condition is a room temperature. It is preferable that the processing ratio (the rolling ratio) is 20% or more. More preferably, it is 30% or more. The processing method is not particularly limited. For example, rolling, drawing, extrusion, groove rolling, forging, pressing, or the like can be used.

(Intermediate Heat Treatment Step S04)

After the rough working step S03, a heat treatment is carried out for softening, which aims to reliably form a solid solution, form a recrystallized structure or improve working properties. A method for the heat treatment is not particularly limited; however, preferably, the heat treatment is carried out: at a holding temperature of 400° C. to 900° C.; for a retention time of 10 seconds or more and 10 hours or less; in a non-oxidizing atmosphere or a reducing atmosphere. In addition, the cooling method after heating is not particularly limited. However, it is preferable that a method such as the water quenching and the like having the cooling rate of 200° C./min or more is used.

Meanwhile, the rough working step S03 and the Intermediate heat treatment step S04 may be repeatedly carried out.

(Finish Working Step S05)

The copper material which has been subjected to the Intermediate heat treatment step S04 is finish-worked in order to be worked into a predetermined shape. Meanwhile, the temperature condition in the finish working step S05 is not particularly limited. However, it is preferable that the temperature condition is set to the range of −200° C. to 200° C., which corresponds to cold or warm rolling, in order to suppress recrystallization or softening. It is particularly preferable that the temperature condition is the room temperature. In addition, the processing rate is appropriately selected so that the copper alloy approximates to a final shape. However, in order to increase strength by means of work hardening; or by means of increasing the ratios of the Brass and Copper orientations, which are rolling textures in the finish working step S05, the processing ratio is preferably set to 20% or more. In addition, in a case in which additional improvement in the strength is required, the processing ratio is more preferably set to 30% or more. Even more preferably, it is set to 40% or more.

On the other hand, in order to suppress the excessive orientation of the Brass orientation and the Copper orientation, it is preferable to set the processing ratio at 75% or less, more preferably the processing ratio at 70% or less.

(Finish Heat Treatment Step S06)

Next, a finish heat treatment is carried out on the plastically-worked material obtained using the Finish working step S05 in order to improve the stress relaxation resistance and to obtain the effect of the low temperature annealing hardening; or to remove the residual strains.

If the heat treatment temperature were too high, the strength ratio $TS_{TD}/TS_{LD}$ would be significantly reduced. Therefore, it is preferable that the heat treatment temperature is set in the range of 100° C. or more and 600° C. or less. More preferably, it is set in the range of 200° C. or more and 500° C. or less. Meanwhile, in the Finish heat treatment step S06, it is necessary to set heat treatment conditions (temperature, time, and cooling rate) so as to prevent the significant decrease of the strength due to recrystallization.

For example, it is preferable that it is retained for roughly 1 second to 120 seconds at 350° C. This heat treatment is preferably carried out in a non-oxidizing atmosphere or a reducing atmosphere.

The method of the heat treatment is not particularly limited. However, a short time heat treatment with the continuous annealing furnace is preferable in view of the effect of reducing the production cost.

Furthermore, the above-described finish working step S05 and the finish heat treatment S06 may be repeatedly carried out.

As described above, the plastically-worked copper alloy material for an electronic and electric device and the rolled plate (thin plate) of the present embodiment are produced. The plate thickness of the plastically-worked copper alloy material for an electronic and electric device (thin plate) is set to the range of more than 0.05 mm to 3.0 mm or less. Preferably, the thickness is set to the range of more than 0.1 mm to less than 3.0 mm A plastically-worked copper alloy material for an electronic and electric device (thin plate) having a thickness of less than 0.05 mm is not suitable for using as a conductive body in the high current application. In a plastically-worked copper alloy material for an electronic and electric device (thin plate) having a thickness of more than 3.0 mm, the press punching processing becomes difficult.

The plastically-worked copper alloy material for an electronic and electric device of the present invention may be used as a component for an electronic and electric device directly. Alternatively, a Sn plating layer or a Ag plating layer having the film thickness of 0.1-100 μm may be formed on one or both sides of the plate surfaces. At this time, it is preferable that the plate thickness of the plastically-worked copper alloy material for an electronic and electric device is 10-1000 times of the thickness of the plating layer.

In addition, the component for an electronic and electric device such as terminals of connectors, press-fits, or the like; relays; lead frames; bus bars; and the like, is formed by performing punching processing, bending, or the like using the copper alloy for an electronic and electric device of the present embodiment as the material.

According to the copper alloy for an electronic and electric device of the present embodiment configured as described above, the strength and the stress relaxation resistance can be improved without significantly reducing the electrical conductivity by solid soluting Mg in the copper matrix since the Mg content is set to the range of 0.15 mass % or more and less than 0.35 mass %.

In addition, the conductivity is set to 75% IACS or more in the copper alloy for an electronic and electric device of the present embodiment. Thus, it can be applied to applications in which high conductivity is needed.

In the copper alloy for electronic and electric devices according to the present embodiment, the strength ratio $TS_{TD}/TS_{LD}$, which is calculated from strength $TS_{TD}$ obtained in a tensile test performed in a direction perpendicular to a rolling direction and strength $TS_{LD}$ obtained in a tensile test performed in a direction parallel to the rolling direction, is more than 0.9 and less than 1.1. Thus, there is less strong anisotropy in the copper alloy; a sufficient strength is secured even in the case requiring strength in both of the LD direction and the TD direction such as in terminals and busbars for high current usage; and occurrence of cracking or the like, which occurs by unnecessary high-strengthening in a specific direction, in bending work can be suppressed. In other words, the copper alloy can obtain excellent bendability in bending in a direction in which the bending axis is perpendicular to the rolling direction (GW bending) and in bending in a direction in which the bending axis is parallel to the rolling direction (BW bending). Because of these, the copper alloy can obtain excellent bendability in bending in a direction in which the bending axis is perpendicular to the rolling direction (GW bending) and in bending in a direction in which the bending axis is parallel to the rolling direction (BW bending).

In addition, in the case where P is added to the copper alloy for electronic and electrical device of the present embodiment; and the P content is set to the range of 0.0005 mass % or more and less than 0.01 mass %, castability can be improved by reducing viscosity of the copper alloy melt.

In addition, formation of coarse precipitations containing Mg and P can be suppressed since the Mg content [Mg] in mass % and the P content [P] in mass % satisfy the relational expression of $[Mg]+20\times[P]<0.5$. Accordingly, reduction of cold workability and bendability can be suppressed.

Moreover, the ratio between the content of Mg, which reduces the castability, and the content of P, which improves the castability, is optimized since the Mg content [Mg] in mass % and the P content [P] in mass % satisfy the relational expression of $[Mg]/[P] \leq 400$ in the present embodiment. Accordingly, because of the effect of adding P, the castability can be reliably improved.

In addition, in the present embodiment, the ratio of crystals having a crystal orientation within 10° with respect to a Brass orientation {110} <112> is set to 40% or less, and the ratio of crystals having a crystal orientation within 10° with respect to a Copper orientation {112} <111> is set to 40% or less. Thus, it is possible to further suppress the difference between the strength $TS_{TD}$ in a tensile test performed in a direction perpendicular to the rolling direction and the strength $TS_{LD}$ in a tensile test performed in a direction parallel to the rolling direction; and a copper alloy for electronic and electric devices with less anisotropy can be obtained.

In addition, since the plastically-worked copper alloy material for an electronic and electric device of the present embodiment is made of the above-described copper alloy for an electronic and electric device, a component for an electronic and electric device such as terminals of connectors, press-fits, or the like; relays; lead frames; bus bars; and the like can be produced by performing bending or the liken on this plastically-worked copper alloy material for an electronic and electric device.

In the case where the Sn plating layer or the Ag plating layer is formed on the surface, the plastically-worked copper alloy material is particularly suitable for the material of the component for an electronic and electric device such as terminals of connectors, press-fits, or the like; relays; lead frames; bus bars; and the like.

In addition, since the component for an electronic and electric device of the present embodiment (such as terminals of connectors, press-fits, or the like; relays; lead frames; bus bars; and the like) is made of the above-described copper alloy for an electronic and electric device, it can exhibit excellent properties even if it is down-sized and thinned.

Thus far, the copper alloy for an electronic and electric device, the plastically-worked copper alloy material for an electronic and electric device, and the component (terminals, and busbars), which are embodiments of the present invention, have been described, but the present invention is not limited thereto and can be appropriately modified within the scope of the technical concept of the invention.

For example, in the above-described embodiments, examples of the method for producing the copper alloy for an electronic and electric device has been described, but the production methods are not limited to the present embodiments, and the copper alloy for an electronic and electric device may be produced by appropriately selecting an existing manufacturing method.

Examples

Hereinafter, results of confirmation tests carried out in order to confirm the effects of the present invention will be described.

The copper raw material made of oxygen-free copper (ASTM B152 C10100) having the purity of 99.99 mass % or more was prepared. Then, the copper raw material was inserted in a high purity graphite crucible and subjected to high frequency melting in an atmosphere furnace of Ar gas atmosphere. Then, each of additive elements was added in the obtained copper melt to prepare the component compositions shown in Table 1. By pouring the prepared copper melt in a mold, the ingot was produced. In Example 4 of the present invention and Comparative Example 6, a mold made of an insulation material (ISOWOOL) was used. In Example 14 of the present invention, a carbon mold was used. In Examples 1-3, 5-13, 15-30 of the present invention and Comparative Examples 1-5, a copper alloy mold with water-cooling function was used as the mold for casting. The dimensions of ingots were about 20 mm for the thickness; about 150 mm for the width; and about 70 mm for the length.

A portion near the cast surface was subjected to face working; and the ingot was cut out for the size to be adjusted in such a way that the plate thickness of the final product became 0.5 mm.

This block was heated in an Ar gas atmosphere for four hours under a temperature condition shown in Table 2, thereby carrying out a homogenization/solution treatment.

After that, the heat treatment was performed in the temperature condition shown in Table 2 by using a salt bath after performing the rough working in the condition shown in Table 2.

The copper material that had been subjected to the heat treatment was appropriately cut in order to form a shape suitable as the final shape, and surface grinding was carried out in order to remove an oxide layer.

Next, finish rolling (finish work) was carried out in the rolling ratio shown in Table 2 at the room temperature, and a thin plate having the thickness of 0.5 mm, the width of about 150 mm, and the length of 200 mm was produced. In addition, after the finish rolling (finish work), a finish heat treatment was carried out in an Ar atmosphere under a condition shown in Table 2, and then water quenching was carried out, thereby producing a thin plate for characteristic evaluation.

(Castability)

As an evaluation of castability, the presence or absence of rough surface during the above-described casting was observed. One having no visually recognized rough surface at all or one having almost no visually recognized rough surface was graded as "A." One with a minor rough surface with the depth of less than 1 mm was graded as "B." One with rough surface with the depth of 1 mm or more and less than 2 mm was graded as "C." One with a major rough surface with the depth of 2 mm or more was graded as "D". Evaluation results are shown in Table 3.

The depth of rough surface means the depth of the rough surface from the end part toward the central part of the ingot.

(Mechanical Properties)

No. 13B test specimen regulated by JIS Z 2241 was sampled from a strip material for characteristic evaluation, and the 0.2% yield strength was measured using the offset method of JIS Z 2241. The test specimen was sampled in the directions perpendicular and parallel to the rolling direction. Then, the strength ratio $TS_{TD}/TS_{LD}$ was calculated from the obtained strength $TS_{TD}$ and $TS_{LD}$. Evaluation results are shown in Table 3.

(Electrical Conductivity)

A test specimen having a width of 10 mm and a length of 150 mm was sampled from the strip material for characteristic evaluation, and the electrical resistance was obtained using a four-terminal method. In addition, the dimensions of the test specimen were measured using a micrometer, and the volume of the test specimen was computed. In addition, the electrical conductivity was calculated from the measured electric resistance and the volume. Meanwhile, the test specimen was sampled so that the longitudinal direction of the test specimen became perpendicular to the rolling direction of the strip material for characteristic evaluation.

Evaluation results are shown in Table 3.

(Bendability)

Bending working was carried out on the basis of the method of Japan Copper and Brass Association Technical Standard JCBA-T307:2007, the testing method 4.

A plurality of test specimens having a width of 10 mm and a length of 30 mm were sampled from the thin plate for characteristic evaluation so that the bending axis became perpendicular (GW bending) or parallel (BW bending) to the rolling direction; and a W bending test was carried out using a W-shaped jig having a bending angle of 90 degrees and a bending radius of 0.4 mm (R/t=0.8).

The outer circumferential portion of the bent portion was visually observed, and a test specimen in which cracking was observed was graded as "C." A test specimen in which a major folding was observed was graded as "B." A test specimen with no observable folding was graded as "A." Grades A and B were regarded as acceptable bendability. Evaluation results are shown in Table 3.

(Brass Orientation Ratio, Copper Orientation Ratio)

A surface perpendicular to the width direction of rolling, that is, a TD (transverse direction) surface was used as an observation surface. Using an EBSD measurement device and the OIM analysis software, the Brass orientation ratio and the Copper orientation ratio were measured.

Mechanical polishing was performed using waterproof abrasive paper and diamond abrasive grains, and finish polishing was performed using a colloidal silica solution. Using an EBSD measurement device (QUANTA FEG 450 manufactured by FEI Company, OIM DATA COLLECTION manufactured by EDAX/TSL (at present, AMETEK Inc.)) and an analysis software (OIM DATA ANALYSIS Ver. 6.2 manufactured by EDAX/TSL (at present, AMETEK Inc.)), an orientation of each of crystal grains was analyzed under conditions of an acceleration voltage of electron beams of 20 kV, a measurement interval of 0.1 µm step, and a measurement area of 1000 µm$^2$ or more. By determining whether each of crystal grains belonged to the targeted Brass orientation (within 10° from the ideal orientation) or not; and by determining whether each of crystal grains belonged to the targeted Copper orientation (within 10° from the ideal orientation) or not, the ratio of the Brass orientation (area ratio of the crystal orientation) and the ratio of the Copper orientation (area ratio of the crystal orientation) in the measurement area were obtained.

TABLE 1

|  |  | Mg (mass %) | P (mass %) | Cu | [Mg] + 20 × [P] | [Mg]/[P] |
|---|---|---|---|---|---|---|
| Example of the present invention | 1 | 0.15 | 0.0023 | balance | 0.20 | 65 |
|  | 2 | 0.15 | 0.0000 | balance | 0.15 | — |
|  | 3 | 0.16 | 0.0083 | balance | 0.33 | 19 |
|  | 4 | 0.18 | 0.0047 | balance | 0.27 | 38 |
|  | 5 | 0.19 | 0.0028 | balance | 0.25 | 68 |
|  | 6 | 0.21 | 0.0000 | balance | 0.21 | — |
|  | 7 | 0.17 | 0.0004 | balance | 0.18 | 425 |
|  | 8 | 0.23 | 0.0006 | balance | 0.24 | 383 |
|  | 9 | 0.29 | 0.0009 | balance | 0.31 | 322 |
|  | 10 | 0.25 | 0.0076 | balance | 0.40 | 33 |
|  | 11 | 0.23 | 0.0083 | balance | 0.40 | 28 |
|  | 12 | 0.21 | 0.0092 | balance | 0.39 | 23 |
|  | 13 | 0.20 | 0.0108 | balance | 0.42 | 19 |
|  | 14 | 0.16 | 0.0061 | balance | 0.28 | 26 |
|  | 15 | 0.17 | 0.0043 | balance | 0.26 | 40 |
|  | 16 | 0.18 | 0.0026 | balance | 0.23 | 69 |
|  | 17 | 0.31 | 0.0051 | balance | 0.41 | 61 |
|  | 18 | 0.32 | 0.0025 | balance | 0.37 | 128 |
|  | 19 | 0.32 | 0.0071 | balance | 0.46 | 45 |
|  | 20 | 0.24 | 0.0020 | balance | 0.28 | 120 |
|  | 21 | 0.25 | 0.0010 | balance | 0.27 | 250 |
|  | 22 | 0.25 | 0.0016 | balance | 0.28 | 156 |
|  | 23 | 0.26 | 0.0010 | balance | 0.28 | 260 |
|  | 24 | 0.25 | 0.0015 | balance | 0.28 | 167 |
|  | 25 | 0.31 | 0.0082 | balance | 0.47 | 38 |
|  | 26 | 0.32 | 0.0009 | balance | 0.34 | 356 |
|  | 27 | 0.33 | 0.0082 | balance | 0.49 | 40 |
|  | 28 | 0.34 | 0.0000 | balance | 0.34 | — |
|  | 29 | 0.34 | 0.0010 | balance | 0.36 | 340 |
|  | 30 | 0.33 | 0.0008 | balance | 0.35 | 413 |
| Comparative Example | 1 | 0.04 | 0.0013 | balance | 0.07 | 31 |
|  | 2 | 0.03 | 0.0000 | balance | 0.03 | — |
|  | 3 | 0.52 | 0.0000 | balance | 0.52 | — |
|  | 4 | 0.53 | 0.0068 | balance | 0.67 | 78 |
|  | 5 | 0.30 | 0.0036 | balance | 0.37 | 83 |
|  | 6 | 0.16 | 0.0094 | balance | 0.35 | 17 |

TABLE 2

| | | Casting | Homogenization/ solution | Rough working | Intermediate heat treatment | | Finish rolling | Finish heat treatment | |
|---|---|---|---|---|---|---|---|---|---|
| | | Cooling rate (° C./sec) | Temperature (° C.) | Rolling ratio (%) | Temperature (° C.) | Time (sec) | Rolling ratio (%) | Temperature (° C.) | Time (sec) |
| Example of the present invention | 1 | 10 | 550 | 80 | 500 | 60 | 60 | 300 | 60 |
| | 2 | 10 | 500 | 60 | 475 | 300 | 50 | 350 | 60 |
| | 3 | 10 | 550 | 60 | 500 | 60 | 70 | 300 | 60 |
| | 4 | 0.4 | 550 | 60 | 550 | 60 | 50 | 350 | 60 |
| | 5 | 10 | 650 | 80 | 600 | 60 | 60 | 300 | 60 |
| | 6 | 10 | 700 | 70 | 550 | 60 | 75 | 350 | 60 |
| | 7 | 10 | 600 | 80 | 550 | 180 | 70 | 350 | 60 |
| | 8 | 10 | 600 | 80 | 550 | 60 | 60 | 350 | 60 |
| | 9 | 10 | 700 | 80 | 525 | 180 | 60 | 300 | 60 |
| | 10 | 10 | 700 | 60 | 525 | 60 | 50 | 350 | 60 |
| | 11 | 10 | 700 | 80 | 550 | 60 | 70 | 350 | 60 |
| | 12 | 10 | 650 | 70 | 500 | 300 | 60 | 350 | 60 |
| | 13 | 10 | 650 | 80 | 550 | 60 | 60 | 350 | 60 |
| | 14 | 0.8 | 550 | 65 | 500 | 60 | 90 | 400 | 60 |
| | 15 | 10 | 550 | 65 | 525 | 60 | 90 | 350 | 300 |
| | 16 | 10 | 600 | 80 | 550 | 60 | 80 | 450 | 300 |
| | 17 | 10 | 700 | 60 | 600 | 60 | 60 | 275 | 60 |
| | 18 | 10 | 700 | 50 | 600 | 60 | 80 | 275 | 60 |
| | 19 | 10 | 700 | 50 | 650 | 180 | 85 | 250 | 60 |
| | 20 | 10 | 700 | 70 | 550 | 60 | 60 | 350 | 60 |
| | 21 | 10 | 700 | 75 | 550 | 60 | 85 | 350 | 60 |
| | 22 | 10 | 700 | 70 | 550 | 60 | 40 | 350 | 60 |
| | 23 | 10 | 700 | 60 | 575 | 60 | 60 | 350 | 60 |
| | 24 | 10 | 700 | 70 | 525 | 180 | 60 | 350 | 60 |
| | 25 | 10 | 700 | 70 | 550 | 60 | 60 | 300 | 60 |
| | 26 | 10 | 700 | 70 | 550 | 60 | 40 | 350 | 60 |
| | 27 | 10 | 700 | 70 | 500 | 300 | 60 | 300 | 60 |
| | 28 | 10 | 715 | 80 | 550 | 300 | 30 | 300 | 60 |
| | 29 | 10 | 715 | 80 | 600 | 60 | 60 | 300 | 60 |
| | 30 | 10 | 715 | 60 | 550 | 60 | 60 | 350 | 60 |
| Comparative Example | 1 | 10 | 500 | 70 | 400 | 300 | 30 | 250 | 60 |
| | 2 | 10 | 500 | 60 | 425 | 60 | 35 | 275 | 60 |
| | 3 | 10 | 715 | 80 | 575 | 300 | 50 | 350 | 60 |
| | 4 | 10 | 715 | 50 | 650 | 60 | 60 | 350 | 60 |
| | 5 | 10 | 700 | 60 | 650 | 300 | 90 | 200 | 60 |
| | 6 | 0.4 | 550 | 50 | 500 | 60 | 90 | 510 | 60 |

TABLE 3

| | | Castability | Copper orientation ratio (%) | Brass orientation ratio (%) | $TS_{LD}$ (MPa) | $TS_{TD}$ (MPa) | $TS_{TD}/TS_{LD}$ | Conductivity (% IACS) | GW bending | BW bending |
|---|---|---|---|---|---|---|---|---|---|---|
| Example of the present invention | 1 | A | 14 | 7 | 412 | 421 | 1.02 | 89.2 | A | A |
| | 2 | B | 10 | 6 | 368 | 378 | 1.03 | 89.6 | A | A |
| | 3 | A | 16 | 10 | 432 | 428 | 0.99 | 87.6 | A | A |
| | 4 | A | 7 | 10 | 411 | 413 | 1.00 | 86.6 | A | A |
| | 5 | A | 9 | 11 | 421 | 432 | 1.03 | 86.0 | A | A |
| | 6 | B | 18 | 18 | 434 | 442 | 1.02 | 85.0 | A | A |
| | 7 | B | 9 | 12 | 412 | 410 | 1.00 | 87.2 | A | A |
| | 8 | B | 8 | 15 | 410 | 413 | 1.01 | 83.2 | A | A |
| | 9 | B | 9 | 16 | 448 | 461 | 1.03 | 79.8 | A | A |
| | 10 | A | 10 | 13 | 398 | 400 | 1.01 | 82.3 | A | A |
| | 11 | A | 13 | 11 | 428 | 431 | 1.01 | 83.4 | A | A |
| | 12 | A | 12 | 9 | 406 | 398 | 0.98 | 84.3 | A | A |
| | 13 | A | 8 | 12 | 398 | 403 | 1.01 | 85.1 | B | B |
| | 14 | A | 37 | 19 | 463 | 421 | 0.91 | 88.2 | B | A |
| | 15 | A | 33 | 18 | 458 | 427 | 0.93 | 87.3 | B | A |
| | 16 | A | 30 | 19 | 438 | 400 | 0.94 | 86.8 | A | A |
| | 17 | A | 11 | 23 | 443 | 470 | 1.06 | 77.2 | A | A |
| | 18 | A | 15 | 31 | 477 | 516 | 1.08 | 78.3 | A | B |
| | 19 | A | 13 | 36 | 462 | 504 | 1.09 | 77.9 | A | B |
| | 20 | A | 8 | 12 | 408 | 421 | 1.03 | 82.7 | A | A |
| | 21 | B | 18 | 30 | 476 | 475 | 1.00 | 82.4 | A | A |
| | 22 | A | 4 | 9 | 376 | 371 | 0.99 | 82.6 | A | A |
| | 23 | A | 9 | 12 | 416 | 430 | 1.03 | 81.7 | A | A |
| | 24 | A | 6 | 13 | 410 | 423 | 1.03 | 82.3 | A | A |
| | 25 | A | 9 | 16 | 441 | 451 | 1.02 | 78.3 | B | B |
| | 26 | B | 5 | 13 | 381 | 389 | 1.02 | 78.0 | A | A |

TABLE 3-continued

|  |  | Castability | Copper orientation ratio (%) | Brass orientation ratio (%) | $TS_{LD}$ (MPa) | $TS_{TD}$ (MPa) | $TS_{TD}/TS_{LD}$ | Conductivity (% IACS) | GW bending | BW bending |
|---|---|---|---|---|---|---|---|---|---|---|
|  | 27 | A | 10 | 17 | 432 | 448 | 1.04 | 76.7 | B | B |
|  | 28 | B | 5 | 11 | 384 | 392 | 1.02 | 75.8 | A | A |
|  | 29 | B | 10 | 16 | 453 | 467 | 1.03 | 75.3 | A | A |
|  | 30 | B | 11 | 15 | 425 | 438 | 1.03 | 76.8 | A | A |
| Comparative Example | 1 | A | 9 | 6 | 271 | 264 | 0.97 | 95.9 | A | A |
|  | 2 | B | 10 | 7 | 279 | 268 | 0.96 | 96.0 | A | A |
|  | 3 | B | 11 | 19 | 438 | 449 | 1.03 | 67.6 | A | A |
|  | 4 | A | 13 | 28 | 458 | 469 | 1.02 | 67.2 | A | B |
|  | 5 | A | 18 | 42 | 514 | 572 | 1.11 | 78.1 | A | C |
|  | 6 | A | 41 | 23 | 431 | 381 | 0.88 | 90.2 | C | B |

In Comparative Examples 1-2, the Mg content was lower than the range defined in the scope of the present invention; and the strength was insufficient.

In Comparative Examples 3-4, the Mg content was higher than the range defined in the scope of the present invention; and the electrical conductivity was low.

In Comparative Example 5, the strength ratio $TS_{TD}/TS_{LD}$ was higher than the range in the scope of the present invention, and bendability in the case where the bending axis was perpendicular direction (GW bending) with respect to the rolling direction was insufficient.

In Comparative Example 6, the strength ratio $TS_{TD}/TS_{LD}$ was lower than the range in the scope of the present invention, and bendability in the case where the bending axis was parallel direction (BW bending) with respect to the rolling direction was insufficient.

Contrary to that, it was confirmed that the strength, the electrical conductivity, and bendability were excellent; and there was less anisotropy, in Examples of the present invention.

In addition, in the case of adding P, it was confirmed that castability was excellent in Examples of the present invention.

Based on these results, it was confirmed by Examples of the present invention that copper alloy for an electronic and electric device and plastically-worked copper alloy for an electronic and electric device having: excellent electrical conductivity, strength, bendability and castability; and less anisotropy, were provided.

INDUSTRIAL APPLICABILITY

Compared to the conventional technologies, a copper alloy for an electronic and electric device; a plastically-worked copper alloy material for an electronic and electric device; a component for an electronic and electric device; a terminal; and a busbar, each of which has excellent electrical conductivity, strength, bendability, stress relaxation resistance and castability, can be provided.

The invention claimed is:
1. A copper alloy for an electronic and electric device, said copper alloy consisting of:
Mg in a range of 0.15 mass % or more and less than 0.35 mass %;
P in a range of 0.0005 mass % or more and less than 0.01 mass %; and
a Cu balance including inevitable impurities, wherein
the electrical conductivity of the copper alloy is more than 75% IACS, and
a strength ratio $TS_{TD}/TS_{LD}$ is more than 0.9 and less than 1.1, where strength $TS_{TD}$ is obtained in a tensile test performed in a direction perpendicular to a rolling direction and strength $TS_{LD}$ is obtained in a tensile test performed in a direction parallel to a rolling direction.

2. The copper alloy for an electronic and electric device according to claim 1, wherein
the Mg content [Mg] in mass % and the P content [P] in mass % satisfy a relational expression of [Mg]+20×[P] <0.5.

3. The copper alloy for an electronic and electric device according to claim 1, wherein
the Mg content [Mg] in mass % and the P content [P] in mass % satisfy a relational expression of [Mg]/[P]≤ 400.

4. The copper alloy for an electronic and electric device according to claim 1, wherein
a ratio of crystals having a crystal orientation within 10° with respect to a Brass orientation {110} <112> is 40% or less, and
a ratio of crystals having a crystal orientation within 10° with respect to a Copper orientation {112} <111> is 40% or less.

5. A plastically-worked copper alloy material for an electronic and electric device made of the copper alloy for an electronic and electric device according to claim 1.

6. The plastically-worked copper alloy material for an electronic and electric device according to claim 5, wherein a Sn plating layer or a Ag plating layer is provided on a surface of the plastically-worked copper alloy material.

7. A component for an electronic and electric device made of the plastically-worked copper alloy material for an electronic and electric device according to claim 5.

8. A terminal made of the plastically-worked copper alloy material for an electronic and electric device according to claim 5.

9. A busbar made of the plastically-worked copper alloy material for an electronic and electric device according to claim 5.

10. The copper alloy for an electronic and electric device according to claim 1, wherein
the copper alloy is made from a raw material that is melted to produce an ingot, and
the ingot undergoes a heating treatment at a temperature in a range of 300° C. to 900° C.

11. The copper alloy for an electronic and electric device according to claim 1, wherein
the copper alloy has a shape that is formed by a finish working step performed prior to an annealing step.

* * * * *